United States Patent [19]
Joulia

[11] Patent Number: 6,085,759
[45] Date of Patent: Jul. 11, 2000

[54] METHOD OF FILLING A CASE WITH AT LEAST TWO PRODUCTS, AND CASE FILLED IN ACCORDANCE WITH THIS METHOD

[75] Inventor: Gerard Joulia, Paris, France

[73] Assignee: L'Oreal, Paris, France

[21] Appl. No.: 09/039,391

[22] Filed: Mar. 16, 1998

[30] Foreign Application Priority Data

Mar. 14, 1997 [FR] France .................................. 97 03115

[51] Int. Cl.⁷ .......................... A45D 33/00; A45D 33/24
[52] U.S. Cl. ........................................... 132/293; 132/294
[58] Field of Search .................................. 132/293, 294, 132/295, 298, 296, 300, 303, 305; 206/524, 7; 53/474, 237, 239

[56] References Cited

U.S. PATENT DOCUMENTS

| 4,337,859 | 7/1982 | Murphy et al. . | |
|---|---|---|---|
| 5,086,791 | 2/1992 | Ferrari | 132/200 |
| 5,819,764 | 10/1998 | Sussman | 132/293 |

FOREIGN PATENT DOCUMENTS

| 0 191 198 | 8/1986 | European Pat. Off. . | |
|---|---|---|---|
| 0628 393 | 12/1994 | European Pat. Off. . | |
| 519482 | 6/1992 | Germany | 132/293 |
| WO 86 00798 | 2/1986 | WIPO . | |

*Primary Examiner*—John J. Wilson
*Assistant Examiner*—Robyn Kieu Doan
*Attorney, Agent, or Firm*—Oblon, Spivak, McClelland, Maier & Neustadt, P.C.

[57] ABSTRACT

A case (1) is filled by pouring, in the liquid phase, at least two products A and B, the case having a base (2) and a lid (4). The method includes the steps of installing within the case a thin membrane (5) made of a material which is soluble in the solvent of at least one of the products, the membrane (5) being arranged in a manner such as to define, within the case, at least a first space (6) and a second space (7), the first and second spaces (6, 7) being isolated from each other over at least part of the axial height of the case, pouring the product A into the first space (6) and the product B into the second space (7), and allowing the products to dry in a manner such as to set the products, the membrane (5) becoming solubilized in the solvent during the setting of the products A and B within the first space (6) and the second space (7), respectively.

19 Claims, 3 Drawing Sheets

METHOD OF FILLING A CASE WITH AT LEAST TWO PRODUCTS, AND CASE FILLED IN ACCORDANCE WITH THIS METHOD

SUMMARY OF THE INVENTION

1. Field of the Invention

The present invention relates to a method of filling a case by pouring two or more liquid products which differ, in particular in their color shade. The products are positioned by pouring, preferably cold into a case. The products thus poured are converted after solidification into a solid and separable "bar" or "cake" capable of being sampled by the user by means of a finger, a powder puff or a brush. The invention likewise refers to a case obtained by means of this method. The packed products may be blushers, eye-shadows, foundations, etc. The invention is particularly suitable for products based on hydrated plaster ($CaSO_4.2H_2O$).

2. Background of the Invention

Cosmetic make-up products in powder form (eye-shadow, blusher, etc.) having a plurality of color shades and packed in a case by compaction have long been known and used. The cosmetic qualities of the compacted products are not entirely satisfactory. Recently, make-up products have appeared which are introduced into a case by pouring plaster-based formulations. Such cases are designed for a single product, and in particular for a single color, because of the difficulty of pouring two different products into determinate spaces of a single case. This is because when two products are poured into a single space, they have a tendency to become distributed at random within the space, which causes aesthetic problems with the finished product.

One solution comprises producing a case having as many compartments as there are products to be poured. To this end, the case defines a plurality of compartments defined by walls (of a material identical to the material forming the body of the case) molded in an appropriate manner. The problem with such a solution, apart from the additional cost to which it gives rise, is that such intermediate walls create an obstacle to complete or virtually complete emptying of the case, particularly if they define one or more small spaces. Furthermore, such a multi-compartment case offers little flexibility in the arrangement, shape and size of the spaces occupied by each of the products. Such a solution is particularly unsuitable if it is desired to use such products of different colors in order to produce a somewhat complicated logo or any other pattern on the surface of the product.

SUMMARY OF THE INVENTION

Thus, it is an object of the invention to provide a method of filling a case by pouring, making use of two or more products differing, for example, in their color, and offering wide flexibility in terms of the number of products and the size, shape and arrangement of the spaces occupied by each of the products. According to the invention, the products may differ in terms of a feature other than their color.

It is a particular object of the invention to provide a method for pouring a plurality of products into a single case, enabling the finished product to be obtained in which the spaces occupied by each of the products are not physically separated by intermediate walls.

It is another object of the invention to provide a case filled by the method according to the invention.

According to the invention, these and other objects are achieved by a method of filling a case by pouring therein at least two liquid products A and B containing a solvent, which products must not mix significantly over at least part of the axial height of the case, the case having a base and a lid. The method comprises installing within the case at least one thin membrane of a material which is soluble in the solvent of at least one of the products, the membrane being arranged in a manner such as to define, within the case, at least a first space and a second space which are isolated from each other over at least part of the axial height of the case. The product A is poured into the first space and the product B is poured into the second space. The products are allowed to dry and set, the membrane becoming solubilized in the solvent during the setting of the products A and B within the first space and second spaces, respectively. Thus, during setting, the membrane gradually disappears, becoming solubilized in the solvent of the products. The products remain within the respective spaces defined initially by the membranes. After complete drying, a narrow gap may remain separating the products, substantially corresponding to the thickness of the membrane.

Advantageously, the two products are poured simultaneously. This is particularly advantageous when a very thin membrane is used, in order not to cause sagging or collapse of the membrane due to excessive pressure from one side of the membrane. This is also more or less critical as a function of the method of fixing the membrane, for example, to the base or to the lid.

By way of example, the two spaces are concentric. According to another example, the case is of circular cross-section. The space which it defines is divided into a plurality of angular portions of identical or different sizes. By way of another example, one of the products is contained within a space representing a commercial logo.

In the event that the solvent of one and/or the other product is water, the membrane may be formed of animal or plant gelatin or of polyvinyl alcohol of the type: Hydrolène®, Polyviol®, Elvanol®, Mowiol® or Phodoviol®.

The products may be based on plaster and water, to which are added various fillers (colorant/pigment, mother-of-pearl, preservative, mica, perfume), it being possible for products A and B to be of different colors. By way of example, the products are eye-shadows, blushers, foundations, etc.

In order to accelerate the drying of the products, the case is introduced, preferably after setting of the products, into a ventilated oven.

In a particular embodiment of the invention, the products are poured through an aperture in the base, the case having been inverted, the lid serving as a base during the pouring of the products and the membrane being fitted on the lid. This feature is particularly advantageous when it is desired to impart to the free surface of the product a particular profile corresponding to the internal profile of the lid. By way of example, the lid is dome-shaped.

To this end, the membrane may possess a first end fitted on the lid and a second, free end opposite the first end, the membrane being of an axial height less than the axial height of the case, the two spaces intercommunicating at the level of the second end, the product A being poured over a first height substantially equal to the axial height of the membrane, the product B being poured over a height greater than the axial height of the membrane so as to permit, during the solidification of products A and B, the adhesion of product A by product B, means being provided in the vicinity of the base of the case to permit the adhesion of product B in the case. Such means of adhesion may comprise at least one block of foam having open or semi-open cells. Thus, with such an embodiment, it is possible to produce a case containing products which, at least in the vicinity of the free surface of the case, are arranged in accordance with a particular pattern, making it possible in the case of products of different colors to produce colored designs, arranged as desired. Such an arrangement offers numerous possibilities, particularly in aesthetic terms.

Alternatively, when pouring the product takes place through the aperture situated facing the lid, the membrane is mounted on the base of the case bearing, for example, on an internal annular edge of the ring of foam serving for the adhesion of the product.

According to a possible embodiment, the membrane is retained on the lid by means of grooves produced on an inner surface of the lid and suitable for receiving an end edge of the said membrane. Alternatively, an indentation (or an excess thickness) is provided on the inner surface of the lid, the indentation (or the said excess thickness) being defined by an edge that is recessed (or projecting) relative to the inner surface of the lid, against which an end edge of the membrane bears, the free surface of the product facing the lid having an excess thickness (or an indentation) of cross-section substantially corresponding to the cross-section of the said indentation (or to the said excess thickness). This latter configuration makes it possible to produce a relief design in the surface of the product, and is very particularly suitable for the production of a commercial logo. Alternatively, again, the membrane is retained on the lid by bonding or welding of an end edge of the membrane on an inner surface of the lid, or is produced by dual injection molding together with the lid.

The case, in particular the lid, may be transparent or translucent, so as to make the colors of the products contained in the case visible from the outside.

BRIEF DESCRIPTION OF THE DRAWINGS

The invention comprises, apart from the arrangements described above, a number of other arrangements which will be explained below with reference to non-limiting exemplary embodiments shown in the attached figures, wherein.

DETAILED DESCRIPTION OF THE PREFERRED EMBODIMENT

Figure 1A:
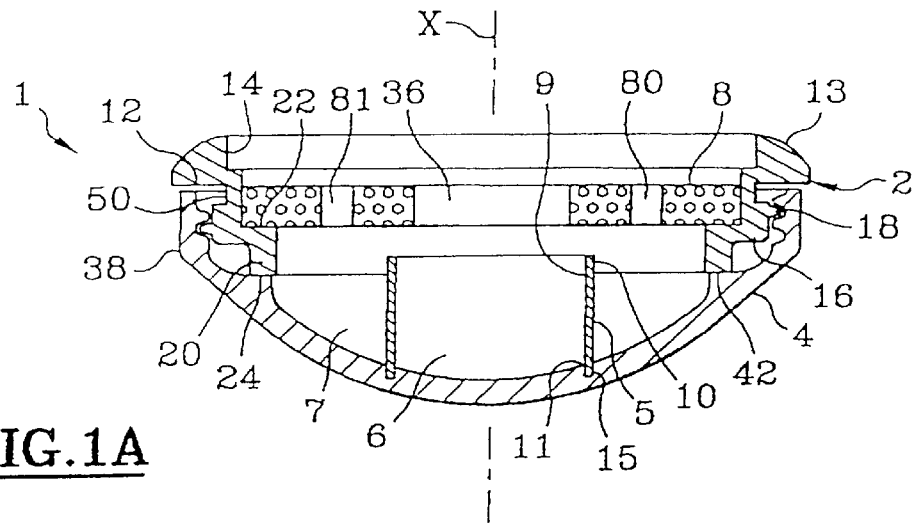
FIGS. 1A to 1E illustrate the various stages of an embodiment of the method according to the invention.

FIG. 1A shows a case 1 which may be used for the implementation of the method according to the invention. As shown, the case is inverted and open at its base, so as to permit its filling through the base. The case 1 has an axis of rotation X, a base 2 defining a receptacle surmounted by a preferably transparent lid 4, and a disc 8 of alveolar foam.

The base 2 has an annular structure and comprises a seating 12 provided with a wide central aperture 14 intended to be stopped, after filling, by a plug 100. On the side of the base, the seating 12 has a periphery 13 of rounded shape, substantially forming a quarter of a circle. On the side opposite the base 2, the seating bears a short cylindrical portion 16 of lesser diameter than that of the seating 12, this portion 16 being provided with an external thread 18 serving to secure the lid 4 by screwing. Connected to the portion 16 is a cylindrical skirt 20 whose diameter is less than that of the portion 16, forming an internal shoulder 22. The skirt 20 has a free end forming a cylindrical edge 24. The cylindrical portion 16 forms, with the base 2, an annular groove 50 suitable for receiving an annular rib formed by the hooking edge of an auxiliary case (not shown) in which the case 1 may be removably installed.

A disc 8 is placed within the receptacle 2. It possesses a central aperture 36 and a plurality of lateral apertures 80, 81 to allow filling, through the aperture 14 of the base 2, of the various spaces defined within the case. The disc 8 extends radially as far as the cylindrical portion 16 and is retained in the recess 22 where it is fixed by thermal or ultrasonic welding. The disc 8 is produced from open-celled alveolar foam, for example foamed polyethylene or polyurethane, which is resiliently compressible. It forms adhesion means for the product on the interior of the case. It may likewise be solidly fixed to the base 2 by bonding or by any other suitable means.

The lid 4 is of hemispherical shape and is molded from a preferably transparent material. Polystyrene, for example, may be used. The lid possesses a cylindrical flank 38 provided with a thread on the inside suitable for interacting with the thread 18 of the base 2. The lid 4 also possesses an annular internal projection 42 suitable for bearing against the edge 24 of the skirt 20 when the lid is fixed on the base 2.

Mounted on the inner surface of the lid is a membrane 5 formed from a material which is soluble in at least one solvent used in the composition of at least one product. In the case of products based on plaster with water as the solvent, the membrane is produced from animal or plant gelatin or from polyvinyl alcohol (PVA). By way of example, use is made of products known under the trade names: Hydrolène®, marketed by the company Idroplast, Polyviol®, marketed by the company Wacker, Elvanol®, marketed by the company Du Pont de Nemours, Mowiol®, marketed by the company Hoechst, or Phodoviol®, marketed by RP Spécialités. The membrane is mounted in a manner so as to define two concentric spaces 6, 7. Its height along the axis X is slightly less than the height of the case under the foam so that the two spaces thus defined intercommunicate via the aperture 9 defined by the free edge 10 of the membrane 5.

The membrane 5 may be mounted on the inner surface of the lid 4 by any appropriate means. In the embodiment shown, the edge 11 of the membrane 5 opposite the free edge 10 is inserted within a groove 15 made in the inner surface of the lid. Such a groove may be molded in the lid 4. Alternatively, a slight indentation (for example of the order of 1 mm in depth) of a cross-section substantially identical to the cross-section of the space 6 is produced in the inner surface of the lid, the indentation being defined by an edge within which the end edge 11 of the membrane 5 is supported. Such an indented structure enables the free surface of the central space 6 to be of excess thickness relative to the free surface of the annular space 7. An inverted relief effect is achieved by producing a slight excess thickness on the inner surface of the lid, defined by an edge which projects relative to the inner surface of the lid. The end edge 11 of the membrane is attached, more or less forcibly, to the edge of the excess thickness. In the finished product, a slight indentation is apparent on the free surface of the product, which indentation has a cross-section substantially identical to the cross-section of the excess thickness in the lid.

Alternatively, the membrane is retained on the lid by bonding or welding of an end edge of the membrane to the inner surface of the lid, or may be produced by dual injection molding together with the lid, with appropriate selection of the materials forming the lid and the membrane. The membrane may have a thickness of between 0.1 mm and 1 mm.

Figure 1B:
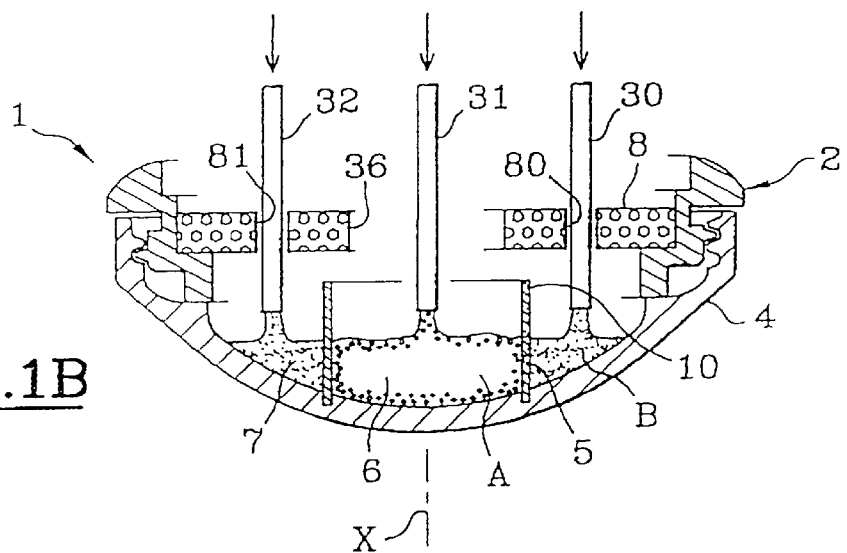

In FIG. 1B, the products A and B are poured simultaneously by means of filling pipes 30, 31, 32 which have pass down into the spaces 6 and 7 through the apertures 36, 80, 81 of the block of foam 8 via the base of the case. Typically, with a case of circular cross-section, a central pipe 31 is used for filling the space 6 with product A and two or more lateral pipes 30, 32 for the uniform filling of the annular zone 7. The products are preferably poured at ambient temperature.

By way of example, the liquefied make-up products may be in paste form, obtained by mixing a particular solid phase either with an aqueous phase or with a binder, in particular a fatty phase in a solvent; they may likewise be in the form of a product based on hot-melt waxes or a gel which is poured in the hot state. Depending on the type of composition selected, solidification thus takes place by evaporation of water or solvent, by cooling or by chemical reaction. In one embodiment of the invention, formulations are used which are based on plaster (about 25%), contained in water (40% to 42.5% for a blusher and 45% to 50% for an eye-shadow) to which are added fillers such as colorants, pigments, mother-of-pearl, preservatives, mica, perfume, etc.

The filling of the space 6 with product A continues until the level substantially reaches the free edge 10 of the membrane 5. The central pipe 31 is then withdrawn and pouring of product B into the annular space 7 continues until the level of product reaches approximately half the height of the block of foam 8. Obviously, above the membrane 5, product B spreads over the entire cross-section of the case 1, including above the central space 6. However, the products do not mix significantly, apart from a slight diffusion in the vicinity of the interface between the two products, which diffusion allows product B to adhere to product A when the products solidify.

Figure 1C:
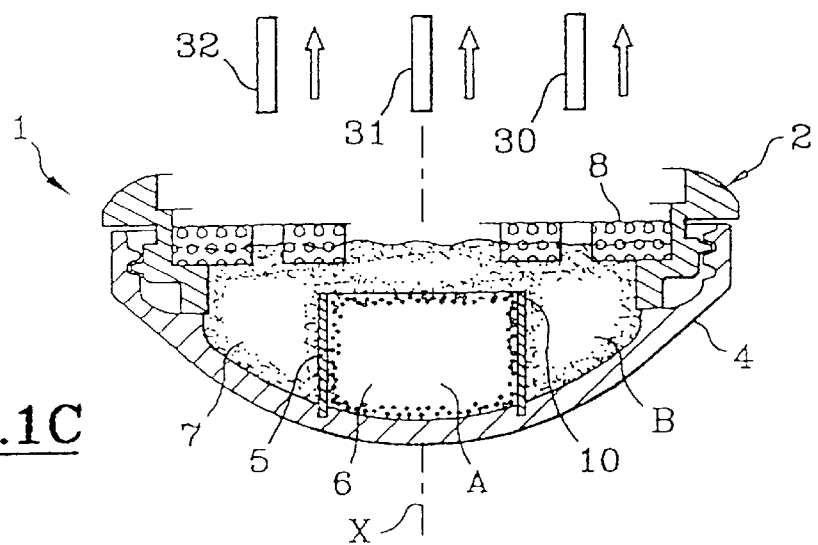

In FIG. 1C, the filling pipes 30, 31, 32 are withdrawn. The case is filled to a height in the vicinity of half the block of foam 8. There then follows a period of caking or setting of products A and B. For plaster-based formulations of the type described previously, hardening takes place during a period of from 20 minutes to 30 minutes. During this period, the membrane becomes solubilized in the water contained in the formulations of products A and B, and gradually disappears, eventually leaving in its place a narrow gap 34 substantially corresponding to the thickness of the membrane 5. The set products occupy the spaces as defined initially by the membrane 5, and do so without mixing.

Figure 1D:
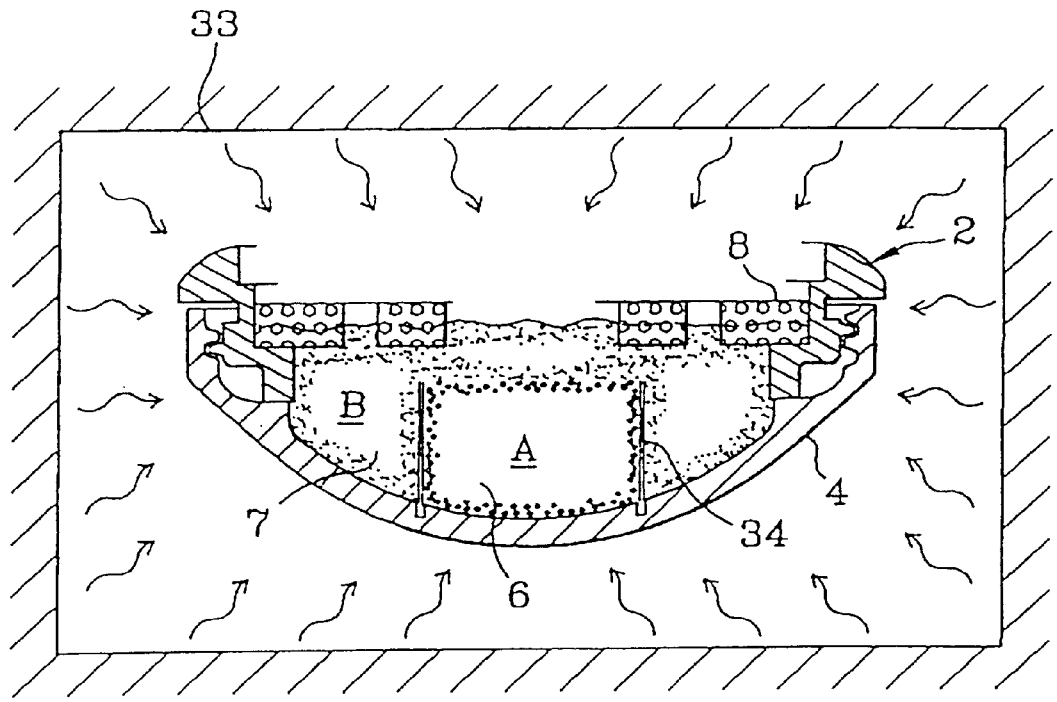

During the subsequent stage shown in FIG. 1D, the case 1 thus filled is introduced into a ventilated stove 33, heated to 45° C. for a period of about 8 hours (for plaster-based formulations), so as to accelerate the drying of the products.

Figure 1E:
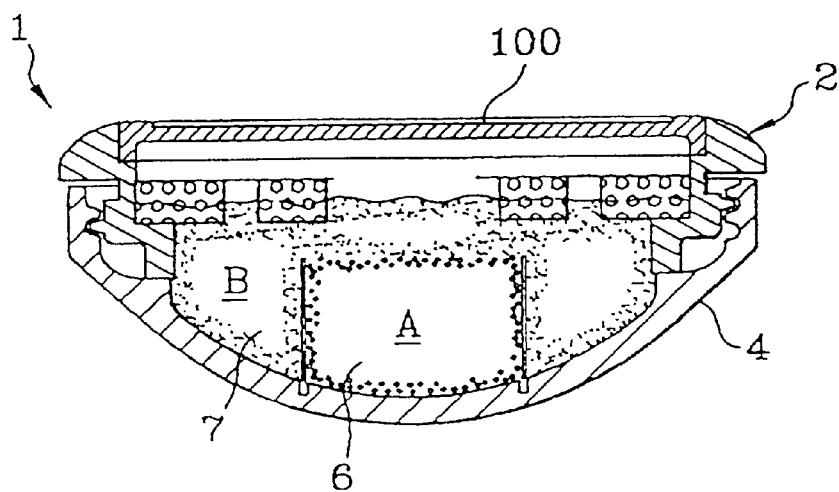

In FIG. 1E the case is withdrawn from the stove. The aperture 14 is sealed by means of a plug 100, which may be snap-fitted, bonded or welded.

Figure 2A:
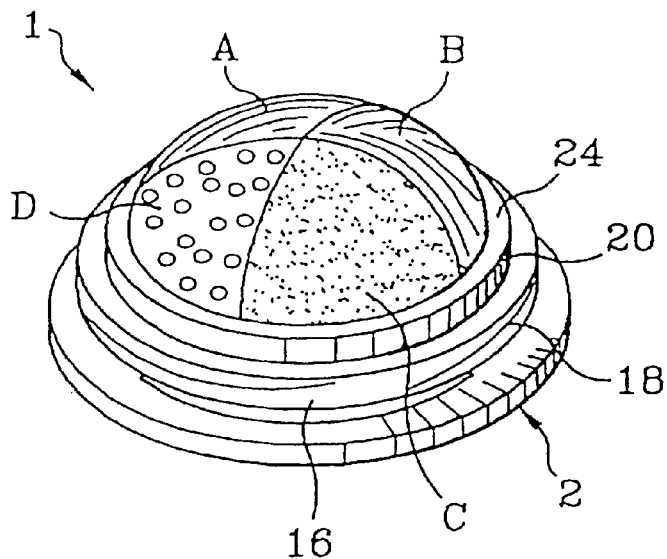
FIGS. 2A and 2B illustrate two different cases filled by means of the method according to the invention.
Figure 2B:
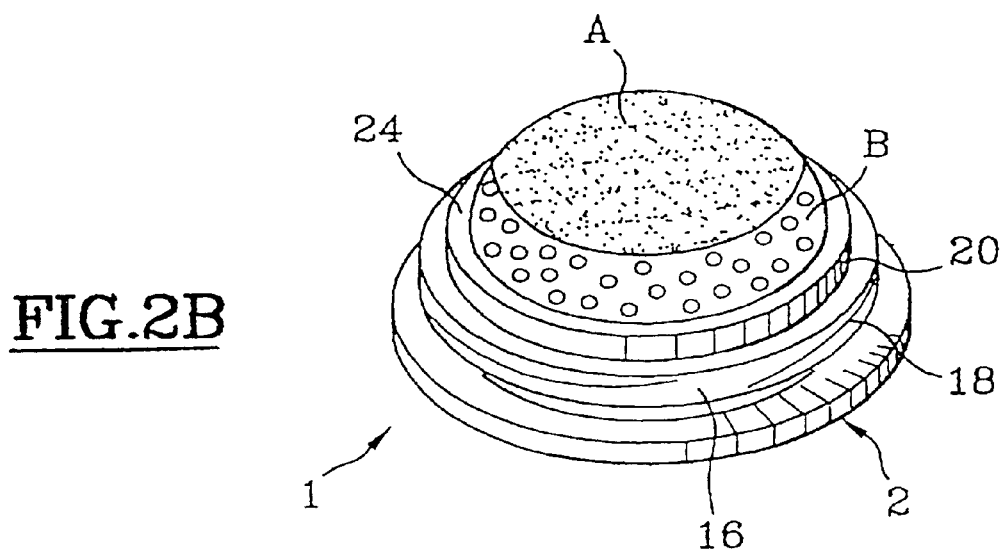

FIG. 2A shows a first case 1 filled in accordance with the method described above with reference to FIGS. 1A to 1E. The free surface of the product within the receptacle forms a dome corresponding to the shape of the dome formed by the lid. The case contains four products A, B, C, D of different colors, arranged in angular zones each forming an angle of about 90°. These volumes are obtained by arranging on the inner surface of the lid, before filling, a cruciform membrane. The arrangement of products A and B in the case according to FIG. 2B is identical to that described with reference to FIGS. 1A to 1E.

In the foregoing detailed description, reference has been made to preferred embodiments of the invention. It is clear that variations may be introduced thereto without departing from the spirit of the invention as claimed hereinbelow.

What is claimed:

1. A method of filling a case, comprising the steps of:

installing within the case a membrane made of a material which is soluble in a solvent, so as to define within the case first and second spaces which are isolated from each other over at least a part of an axial height of the case;

pouring a first product into the first space and a second product into the second space, at least one of the products including the solvent; and allowing the products to dry and set, wherein the membrane becomes solubilized in the solvent during the setting of the products within the first space and the second space.

2. The method according to claim 1, wherein the two products are poured simultaneously.

3. The method according to claim 1, wherein the two spaces are mutually concentric.

4. The method according to claim 1, wherein said solvent is water, the membrane being formed of one of animal gelatin, plant gelatin and a polyvinyl alcohol.

5. The method according to claim 1, wherein said products are of different colors.

6. The method according to claim 4, wherein the products are based on plaster and water, to which are added fillers.

7. The method according to claim 5, wherein the products are one of eye-shadows, blushers and foundations.

8. The method according to claim 1, wherein, after setting of the products, the case is introduced into a ventilated oven so as to accelerate drying.

9. The method according to claim 1, wherein said pouring step comprises inverting the case and pouring the products through an aperture in a base of the inverted case, a lid of the case serving as a base during the pouring step, and the membrane being fitted on the lid.

10. A case containing first and second products, comprising:

a base;

a lid; and a membrane having a first end fitted on the lid to form first and second spaces, the membrane having an axial height less than the axial height of the lid, the two spaces intercommunicating at a second end of the membrane, wherein the first product fills the first space and the second product fills the second space, covers and adheres to the first product, and adheres to the case, wherein the membrane is formed of a material which becomes solubilized in a solvent.

11. The case according to claim 10, wherein the case has block of foam having open or semi-open cells, and the second product adheres to the block of foam.

12. The case according to claim 10, wherein the membrane is retained on the lid by grooves on an inner surface of the lid.

13. The case according to claim 10, including an indentation on an inner surface of the lid, the indentation being defined by an edge defined relative to the inner surface of the lid against which an end edge of the membrane beats, a free surface of the first product facing the lid having an excess thickness of cross-section substantially corresponding to the cross-section of the indentation of the lid.

14. The method according to claim 9, wherein the membrane is bonded or welded to an inner surface of the lid.

15. The method according to claim 9, wherein the membrane is produced by dual injection molding with the lid.

16. The case according to claim 10, wherein the lid is transparent.

17. The method according to claim 4, wherein the polyvinyl alcohol is one of Hydrolène®, Polyviol®, Elvanol®, Mowiol® and Phodoviol®.

18. The method of claim 6 wherein said fillers comprise one of colorant/pigment, mother-of-pearl, preservative, mica and perfume.

19. The case according to claim 10, wherein the membrane is formed of one of animal gelatin, plant gelatin and a polyvinyl alcohol.

* * * * *